US009680253B2

(12) United States Patent
Mehandjiysky et al.

(10) Patent No.: US 9,680,253 B2
(45) Date of Patent: Jun. 13, 2017

(54) CONNECTORS TO CONNECT ELECTRONIC DEVICES AND OTHER DEVICES (71) Applicant: HEWLETT-PACKARD DEVELOPMENT COMPANY, L.P., Houston, TX (US)

(72) Inventors: Dimitre Mehandjiysky, Houston, TX (US); Aki Laine, Houston, TX (US); Michael Delpier, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/035,332

(22) PCT Filed: Jun. 30, 2014

(86) PCT No.: PCT/US2014/044889
§ 371 (c)(1),
(2) Date: May 9, 2016

(87) PCT Pub. No.: WO2015/094407
PCT Pub. Date: Jun. 25, 2015

(65) Prior Publication Data
US 2016/0294113 A1 Oct. 6, 2016

(30) Foreign Application Priority Data

Dec. 18, 2013 (WO) ............... PCT/US2013/075964

(51) Int. Cl.
*H01R 11/30* (2006.01)
*H01R 13/62* (2006.01)
(Continued)

(52) U.S. Cl.
CPC ....... *H01R 13/6205* (2013.01); *G06F 1/1632* (2013.01); *G06F 1/1637* (2013.01);
(Continued)

(58) Field of Classification Search
CPC .... H01R 11/30; H01R 13/30; H01R 13/6205; H01R 13/2421; H01R 13/7037; H01R 13/53; H01R 13/64
(Continued)

(56) References Cited

U.S. PATENT DOCUMENTS 3,521,216 A * 7/1970 Tolegian ............ H01R 13/6205
439/152
5,829,987 A * 11/1998 Fritsch ............... H01R 13/7037
200/51.09
(Continued)

FOREIGN PATENT DOCUMENTS

EP 2254017 11/2010
JP 007334258 A 12/2007
(Continued)

OTHER PUBLICATIONS

"Mount"; http://www.discountdisplays.co.uk/html/ipad-counter-top-mount.html>.
(Continued)

*Primary Examiner* — Chandrika Prasad
(74) *Attorney, Agent, or Firm* — HP Patent Department (57) ABSTRACT An example electronic device is provided in accordance with an aspect of the present disclosure. The electronic device includes a housing having at least a front section and a rear section that is opposite to the front section, a connector embedded in a center of the rear section, wherein the connector includes a connection portion to electronically connect the electronic device to an external system and an attachment portion to mechanically attach the connector to an external system.

19 Claims, 4 Drawing Sheets (51) Int. Cl.
  *G06F 1/16* (2006.01)
  *H02J 50/10* (2016.01)
  *G06F 1/26* (2006.01)
  *H02J 7/02* (2016.01)
  *H01R 13/22* (2006.01)

(52) U.S. Cl.
  CPC .............. *G06F 1/26* (2013.01); *H01R 13/22* (2013.01); *H02J 7/025* (2013.01); *H02J 50/10* (2016.02)

(58) Field of Classification Search
  USPC ...................................................... 439/38–40
  See application file for complete search history.

(56) References Cited

U.S. PATENT DOCUMENTS

| | | | |
|---|---|---|---|
| 7,350,011 B2 | 3/2008 | Keely et al. | |
| 7,467,948 B2* | 12/2008 | Lindberg | H01R 13/6205 439/38 |
| 7,637,746 B2* | 12/2009 | Lindberg | H01R 13/6205 439/38 |
| 7,715,187 B2 | 5/2010 | Hotelling et al. | |
| 8,497,657 B2 | 7/2013 | Franks et al. | |
| 8,553,408 B2* | 10/2013 | Supran | G06F 1/1632 361/679.02 |
| 2005/0026499 A1* | 2/2005 | Choi | H01R 13/2442 439/607.01 |
| 2006/0069837 A1 | 3/2006 | Zhang et al. | |
| 2011/0187323 A1* | 8/2011 | Gourley | H02J 7/02 320/111 |
| 2011/0297566 A1* | 12/2011 | Gallagher | F16M 11/105 206/320 |
| 2012/0170212 A1 | 7/2012 | Gallouzi et al. | |
| 2012/0181196 A1 | 7/2012 | Mongan et al. | |
| 2012/0257342 A1 | 10/2012 | Shindo et al. | |
| 2013/0044418 A1 | 2/2013 | Iwamoto et al. | |
| 2013/0058022 A1 | 3/2013 | Knutson et al. | |
| 2013/0068915 A1 | 3/2013 | Yang | |
| 2013/0078855 A1 | 3/2013 | Hornick et al. | |
| 2013/0088830 A1 | 4/2013 | Lim | |
| 2013/0107126 A1 | 5/2013 | Nonomura et al. | |
| 2013/0277529 A1 | 10/2013 | Bolliger | |
| 2014/0273546 A1* | 9/2014 | Harmon | H01R 13/6205 439/39 |
| 2016/0252930 A1* | 9/2016 | Senatori | G06F 1/1616 |
| 2016/0282905 A1* | 9/2016 | Laine | G06F 1/1632 |
| 2016/0294113 A1 | 10/2016 | Mehandjiysky | |

FOREIGN PATENT DOCUMENTS

| | | |
|---|---|---|
| JP | 2011-234744 | 11/2011 |
| KR | 10-2013-0082443 | 7/2013 |
| TW | M466540 | 12/2013 |

OTHER PUBLICATIONS

"iOwall Magnetic Wall-mount for Tablets & Smartphones"; <http://www.brookstone.com/iowall-magnetic-wall-mount-for-tablets-smartphones>.

David Landry; "Wall Mount"; issue: Jun. 18, 2013; http://www.tablet2cases.com/case-o-pedia/styles/wall-mount/>.

"Asus EP121 Slate PC Unofficial Blog", <http://ep121.wordpress.com/2011/01/08/the-ep121-product-tour/comment-page-1/>, retrieved on Aug. 9, 2013 (54 pages).

"Dell XPS 18 Stand with Adapter", <http://accessories.dell.com/sna/products/Docking/productdetail.aspx?c=ca&l=en&s=bsd&cs=cabsdt1&sku=332-1529>, 2013 (1 page).

"Magnetic Charging Dock Dk30", <http://www.sonymobile.com/global-en/products/accessories/magnetic-charging-dock-dk30/>, 2013 (2 pages).

"11 Cool iPad Stands and Docks to Stylize your Tablet", <http://www.designswan.com/archives/11-cool-ipad-stands-and-docks-to-stylize-your-tablet.html>, Aug. 15, 2011 (22 pages).

"Scosche Bassdock Speaker for iPad 3", <http://gadgetsandaccessories.edublogs.org/2012/09/05/scosche-bassdock-speaker-for-ipad-3/>, Sep. 5, 2012 (4 pages).

Ratas; "Review of Magnetyze Apple Iphone 4/ 4s Charger", <http://blog.testfreaks.com/review/review-of-magnetyze-apple-iphone-4-4s-charger/>, Oct. 18, 2012 (15 pages).

* cited by examiner

CONNECTORS TO CONNECT ELECTRONIC DEVICES AND OTHER DEVICES

RELATED APPLICATIONS

This application is a national stage application under 35 U.S.C. §371 of PCT/US2014/044889, filed Jun. 30, 2014, which claims priority from PCT/US2013/075964, filed Dec. 18, 2013, both of which are hereby incorporated herein by reference.

BACKGROUND

Increasing number of today's users carry at least one portable electronic device that is equipped with a diverse set of functions. These electronic devices can communicate with each other, reach the Internet, perform different tasks, or access various services through networks. The electronic devices have become essential personal accessories, connecting users to friends, work, and entertainment.

DETAILED DESCRIPTION OF SPECIFIC EXAMPLES

With the recent improvements in technology, portable electronic devices (e.g., tablets, laptops, smartphones, etc.) continue to play an increasing role in people's life. Different users rely on different type of portable electronic devices for many day-to-day activities and work related tasks. As used herein, the terms "portable electronic device" and "electronic device" may be used interchangeably and refer to any one of various tablets, smartphones, cellular telephones, personal data assistants (PDA's), laptops, computers, and other similar electronic devices that are generally movable and include at least a housing and a display.

Portable electronic devices come in different sizes, forms, and may include different technical features. Some portable electronic devices are configured as smartphones or tablets and include a touchscreen as their main input interface. Other portable electronic devices are configured as notebooks (e.g., laptops) and include a keyboard portion (i.e. housing) that is attached to a display screen (that may or may not be touch sensitive). In addition, portable electronic devices may also be configured as convertible electronic devices that include a keyboard/battery portion and a display screen portion Regardless of the type of portable electronic devices, many of the recently manufactured portable electronic devices (e.g., tablets, smartphones, etc.) include larger and more sophisticated processors, hard drives, and memories as compared to similar older devices. Therefore, these devices now have improved operating capabilities and may be used to perform many functions or tasks that are usually performed with desktop computers. Many users now desire to utilise these efficient portable electronic device as their primary office or home devices. In addition, these devices continue to be heavily used for entertaining (e.g., watching movies, browsing the Internet, etc.) However, since one of the main advantages of these devices is portability and most of the devices have touchscreens, performing many of the complex tasks on these devices with one hand while holding the devices with the other hand may be difficult.

Consequently, in many situations it is desirable to use secondary accessories (e.g., stands, docks, etc.) to support the portable electronic devices while the user is performing certain tasks. As used herein, the terms "electronic device accessory," "dock," "stand," and "docking station" may be used interchangeably and refer to any one of supporting devices or systems that may support an electronic device in various positions or orientations.

To support the electronic devices means that the stands or docks bear all or part of the weight of the electronic device (i.e., they hold up the devices) when the devices are positioned on the stands or docks. It is also desirable that such supporting accessories are easy to use, securely engage the portable electronic devices when the devices attached to them, and also provide enhanced functional capabilities to the attached devices. For instance, a user of the portable electronic devices and such supporting accessories may often want to switch the orientation or the position of the devices (e.g., when he or she is finished watching a movie and wants to do type a paper on the device). However, in many cases, this operation requires one or more of the following removing the device from the stand, adjusting the position of the stand (e.g., by mechanically moving specific portions of the stand to different positions), rotating the device, and reattaching the device on the stand. Repeating this process many times throughout the day may be cumbersome to the users of such electronic devices.

In order to attach electronic devices to secondary accessories (e.g., stands, docking stations, etc.), many time the electronic devices must be first attached to a case or an external platform to support the electronic device on the accessory. In addition, many electronic devices use docking connectors located to the bottom of the electronic device. That kind of connection does not work well with wall or table-top docks, or soft covers, because it requires an additional support piece (e.g., a J-bar) to be added, and it also requires a longer cable or flexible printed circuit board (PCB) to be routed through plastic or metal parts, complicating manufacturing and raising costs of the products.

In addition, there is a tendency that many of the new portable electronic devices are constructed to be very thin. This is due to users demand for light portable electronic devices that are easy to carry and do not take up too much space. Constructing a thin portable electronic device usually means that the device includes a housing with a very small width. One disadvantage of constructing very thin portable electronic devices is that such devices can not include many standard input/output ("I/O") ports (e.g., a High-Definition Multimedia Interface (HDMI) port, a Universal Serial Bus (USB) port, etc.). In addition, most current portable electronic devices have very limited space for speakers due to the small width of the devises. That limits the functionality of the portable electronic devices and makes them less desirable.

The present description is directed to an electronic device that includes a recessed connector (e.g., a dock connector) embedded approximately in the center of the rear section (i.e., the back) of an electronic device. The connector may include a connection portion to electronically connect the electronic device to a secondary accessory or an external system and an attachment portion to mechanically attach the connector to the external system or accessory. The proposed connector is recessed into the rear section of the electronic device to define a female connector portion that may engage an extended male connector portion positioned on an external system.

As used herein, the terms "connector" and "dock connector" may be used interchangeably and refer to a connector used to attach an object (e.g., an electronic device) to an external resource, device, or system. The connector may be a male connector that includes at least one exposed pin or a female connector that includes opening(s) in which the male connector may be inserted. A connector carries a variety of signals and power to simplify the process of docking an electronic device and the communication between the electronic device and the external resource, device, or system. A connector may be embedded in a mechanical fixture used to support or align a device or may be positioned at the end of a cable.

In addition, the present description is directed to a system that includes a docking station with a male connecter to attach to a female connector embedded in the center of the rear section of an electronic device. The proposed system allows full connectivity between the electronic device having a rear female connector and a large variety of ecosystem accessories, such as soft covers, secondary screens, wall mounts, adjustable angle docks, etc.

The proposed docking station may have different configurations. In one example, the docking station includes a first housing, a rotating member mounted to the first housing, a male connector mounted to the rotating member, and a fastener (e.g., a magnet) embedded in the male connector to attach an electronic device to the docking station. In another example, the docking station includes a base, a first elongated arm connected to the base and to a second connector arm via a torqued hinge. A male connector may extend from the second connector arm to attach to the female connector of the electronic device when the electronic device is attached to the docking station.

The proposed docking accessories may further include various elements (e.g., I/O ports, dock connector, speakers, etc.) that allow the supporting accessories to interact with the attached electronic device and also to provide enhanced connectivity and functional capabilities of the electronic device when the device is attached to the stand. As used herein, the term "port" refers to any one of various openings that may be included in an electronic device and may include any of I/O or communication ports, multimedia ports, power ports, audio ports or jacks, memory card readers, or any other openings or ports that allow for communication and/or interaction with external devices or objects.

Therefore, the devices and systems described herein allow electronic devices to be easily attached to supporting accessories without the use of an additional covers or sleeves. In addition, the proposed system provides a capability to view and use the attached electronic device on a daily basis in different orientations or positions without the hassle of removing the device from the stand and, in some cases, without the need to mechanically adjust elements of the stand. Further, the proposed system allows a user to charge the device via the attached dock connector. Also, the plurality of embedded elements (e.g., ports, speakers, buttons, etc.) of the proposed stand enhance the operating capabilities of the attached electronic device while the device is attached to the stand. Thus, a user may operate the electronic device regularly as their main home or office device.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

Figure 1:
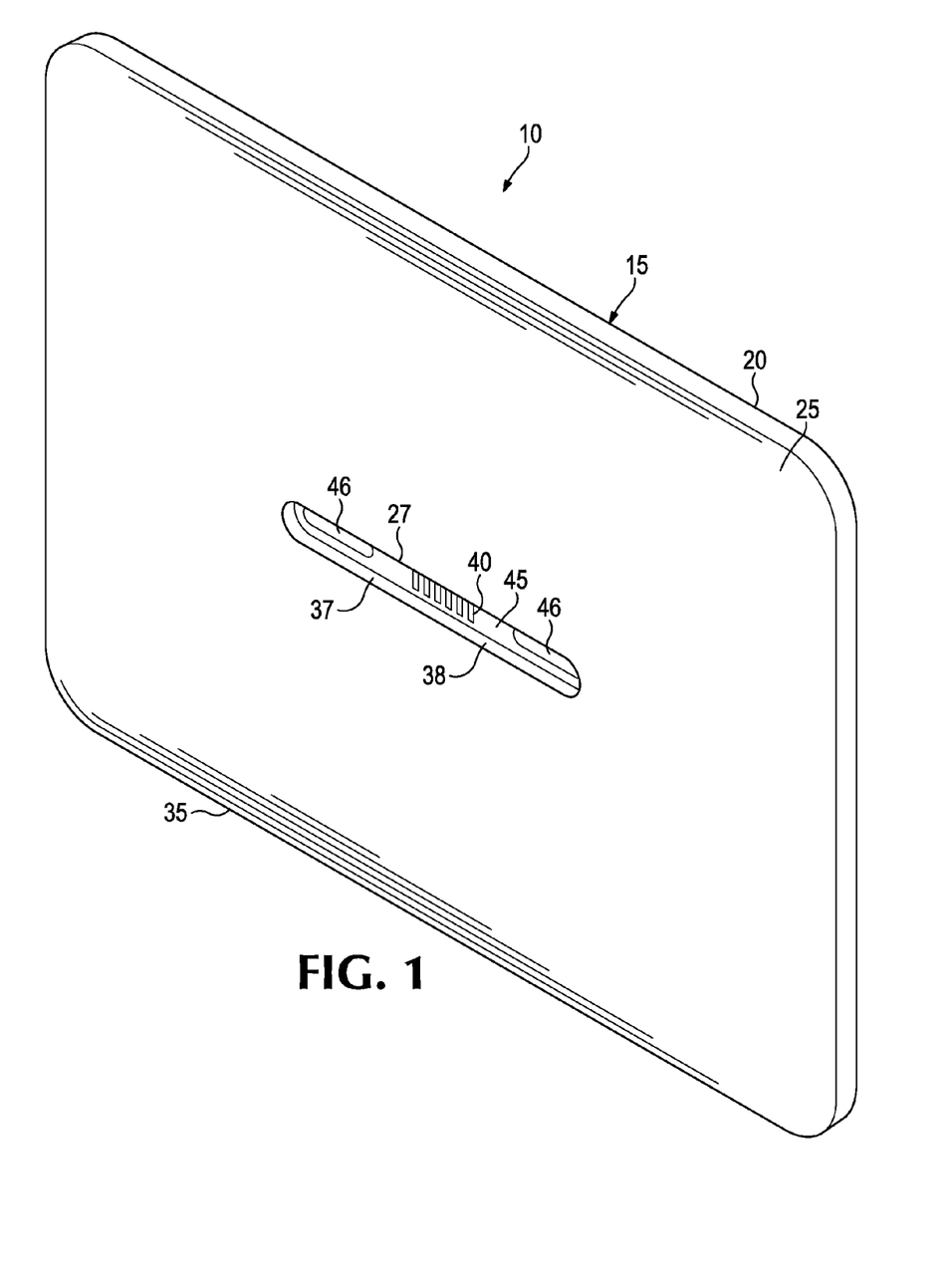
FIG. 1 is a perspective view of an electronic device including a recessed rear connector according to an example implementation.

With reference to the figures, FIG. 1 is a perspective view of an electronic device 10 having a recessed rear connector according to an example implementation. In the illustrated example, the electronic device 10 includes a housing 15 having a first (e.g., front) section 20, a second (e.g., rear) section 25 that is opposite to the first section 20, and a recessed connector 27 embedded approximately in the center of the rear section 25. The first section 20 may include a display 30 (not shown in FIG. 1) and the second section 25 may include a base 35. The base 35 and the display 30 may be substantially rectangular. In another example, the first section 20 may also include additional components (e.g., a keyboard, etc.). The electronic device 10 illustrated in FIG. 1 may be a portable electronic device (e.g., a tablet, etc.) or a convertible electronic device (e.g., a conversable laptop). For example, the electronic device 10 may be a tablet, a laptop, an all in one computing device, a gaming console, a mobile telephone, a music player, a visual player, a personal digital assistant (PDA), an electronic notepad, a portable monitor (i.e., without a processor) or any other suitable electronic device that includes at least housing and a display screen.

The housing 15 may be constructed from metal, plastic, fiber resin, or another suitable material. The housing 15 may include resistance increasing components (i.e., legs, not shown) on a rear surface of the base 35 for placing the electronic device 10 on a surface such as a desk or table. The housing 15 may also include components of the electronic device 10 such as a processor, memory, a printed circuit board, battery, or other applicable components (not shown). The display 30 may be an LCD (Liquid Crystal Display), OLED (organic light emitting display) or another type of display. In one example, the display may be a touchscreen display that can be controlled by the user through simple or multi-touch gestures by touching the screen with at least one finger.

In one example, the connector 27 is embedded in the center of the rear section 25. This position of the connector 27 allows the device 10 to be securely attached any stand or accessory without any excessive weight of a portion of the device 10 pulling the device 10. The center position of the connector 27 also allows for easier rotation of the electronic device 10 when the device 10 is attached to an accessory or a dock.

In one example implementation, the connector 27 is recessed into the rear section 25 of the electronic device to define a female connector portion 37 of the connector. The connector 27 further includes wall sections 38 forming a recess into the base 35 to define the area of the connector. The wall sections 38 may include supporting members (e.g., rubber flat bumpers; not shown) ensuring the electronic device 10 snaps comfortably to an external system without scuffing. Alternatively, the wall sections 38 may also include attachment mechanisms (e.g., magnets, etc.) to extend the support provided by the attachment portion 45. In other words, the connector 27 may be a sunken or recessed connector such that the elements of the connector 27 are positioned below the surface of the rear section 25. As explained in additional details below, the connector 27 is to engage an extended male connector portion positioned on an external system (shown in FIGS. 2-4). Depending on position of the male connector and on the rotating capabilities of the external system or accessory, the connector 27 may support the electronic device 10 in at least a first orientation (e.g., landscape) and a second orientation (e.g., portrait) when the electronic device is attached to an external system. In other example implementations, the connector 27 may be a flat connector (i.e., the female connector portion 37 may be at the same level as the base 35) or may be protruded from the center of the rear section 25.

The connector 27 may include a connection portion 40 to electronically connect the electronic device 10 to an external system and an attachment portion 46 to mechanically attach the connector to the external system. The connection portion 40 may include a specific configuration of exposed prongs or pins (4, 5, 6, etc.) that allow a user to electronically connect the connector 27 with a corresponding set of pins on a connector of the corresponding accessory or system. The attachment portion 45 may include at least one magnet 46 to support the attachment of the connector 27 to an extended male connector portion (shown in FIGS. 2 and 3) of an external system to mechanically attach the connector 27 to the external system. It is to be understood that the magnets 46 on the attachment portion 45 may be positioned on the entire attachment portion 45 or on specific areas of the attachment portion 45.

The male connector portion (i.e., the male connector) of the corresponding system or accessory may be protruded or recessed. The male connector may include corresponding connection portion (e.g., pins) and attachment portion (e.g., magnets), which would use reverse magnet polarity to lead the user into easily and seamlessly snapping the device 10 in place and thus securely attaching the device to an accessory. In alternative examples, the attachment portion 45 of the connector 27 may include other means (e.g., fasteners, pins, clips, etc.) for mechanically attaching and supporting the connector 27 and the device 10 to an external device or a system. In addition, the connector 27 on the device 10 may be a male connector and the connector or the connector portion of the corresponding system or accessory may be a female connector.

The electronic device 10 may receive power through the connector 27 when attached to an external system so a user may power charge the electronic device 10. In addition, the combination the dock connector 27 and a docking accessory allows for a full spectrum of connection and communication capabilities between the device 10 and a variety of external accessories and systems (e.g., a screen, speakers, home devices, etc.).

Figure 2:
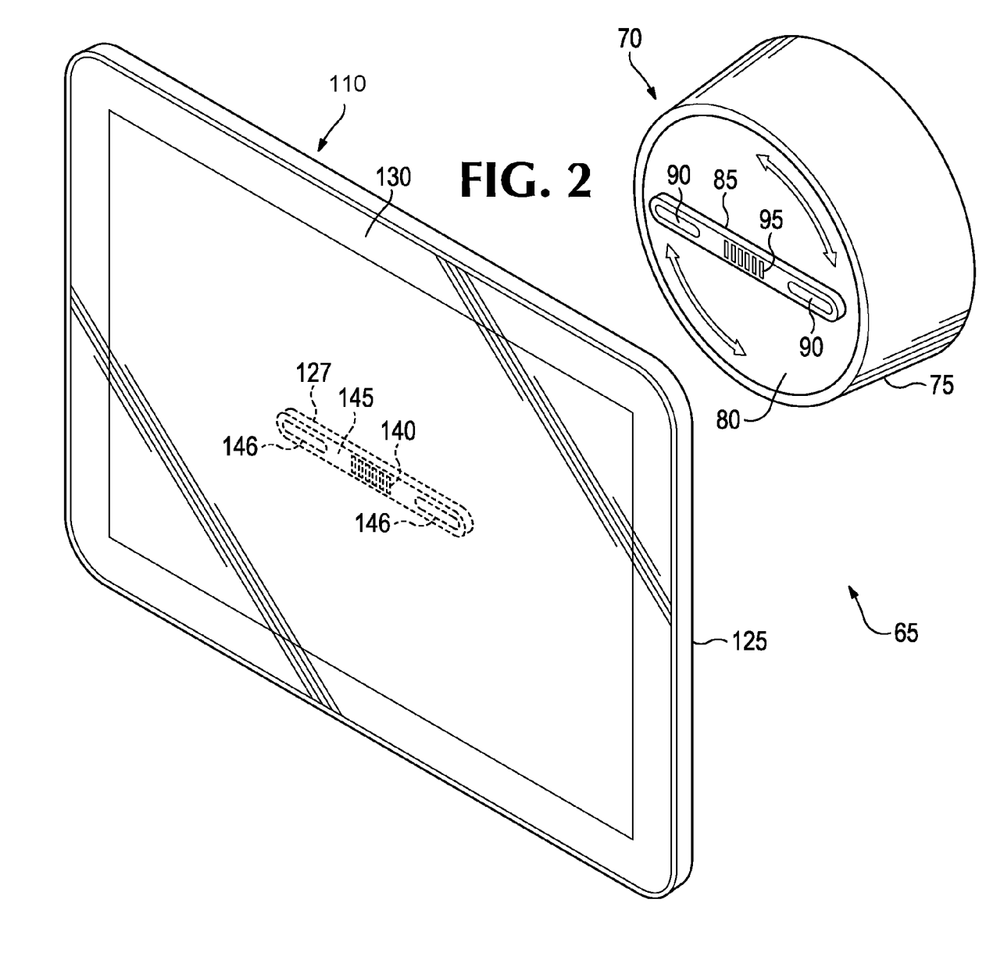
FIG. 2 is a perspective view of a system including an electronic device docking station with an electronic device to be attached to the docking station according to an example implementation.

With continued reference to the figures, FIG. 2 is a perspective view of a system 65 including an electronic device docking station 70 with an electronic device 110 to be attached to the docking station 70 according to an example implementation. The components of the electronic device 110 may be similar to the corresponding components of the electronic device 10 described with respect to FIG. 1. In one example, the docking station 70 may be mounted to the wall, and it may require pre-wiring to employ smart control functionality (e.g., electrical cabling connected to a smart-home hub, etc.).

In one implementation, the docking station 70 includes a first housing 75, a rotating member 80 mounted to the first housing, a male connector 85 mounted to the rotating member 80, and a fastener 90 embedded in the male connector 85 to attach an electronic device to the docking station. While FIG. 2 shows a first housing 75 having a circular form, the first housing may be designed in other shapes. In addition, the docking station may include wires and other electrical or mechanical components to support the operation of the docking station 70.

The male connector 85 of the docking station 70 may attach the docking station to the electronic device 110 that includes a recessed female connector 127 positioned at the center of the rear section 125 of the electronic device 110. The components of the female connector 127 may be similar to the corresponding components of the female connector 27 described with respect to FIG. 1. Although the male connector 80 and the female connector 127 are illustrated as horizontal connectors, it is to be understood that these connectors may be positioned vertically or in any other orientation on the corresponding devices.

For example, the female connector 127 may include a connection portion 140 to electronically connect the electronic device 110 to the docking station 70 and an attachment portion 145 (with magnets 146) to mechanically attach the female connector 127 to the fastener 90 of the male connector. The male connector may also include a connector portion 95 with a specific configuration of exposed prongs or pins to correspond to the connection portion 140 of the female connector. In one example, the female connector 127 is recessed into the rear section 125 of the electronic device 110 and the male connector 85 is protruded from the rotating member 80 of the docking station 70 to engage the female connector 127. Alternatively, the male connector 85 may be recessed into the rotating member 80 or may have a slim profile (i.e. may be at the same level as the rotating member 80).

The male connector 35 may further include supporting members (e.g., rubber flat bumpers; not shown) to ensure that the electronic device 110 connects to the docking station 70 without any friction. In one example, the fastener 90 of the male connector may be a magnet or any other attachment mechanism that can support secured attachment of the docking station to an electronic device. The fastener 90 may use reverse magnet polarity to snap the device 110 to the docking station 70 securely attaching it to the male connector 70. The fastener 90 of the connector 70 may alternatively include other mechanical means (e.g., pins, clips, etc.) for attach the connector 70 to the connector 127 of the device 110.

Regardless of the type of attachment mechanism that is used, there is always a strong mechanical connection between the electronic device 110 and the stand 70. This connection provides secure attachment of the electronic device 110 to the electronic device stand 70 and thus allows a user to change the orientation of the device without removing the device from the stand. The attachment mechanism may further include a release mechanism (not shown) to release the attachment between the elements of the attachment mechanism and the electronic device 110. For example, the release mechanism may be positioned on the housing 75 or on the rotating member 80 of the stand. The release mechanism may be a sliding mechanism, a push button, an electronic cylinoid, or any other type of release mechanism that is designed to disengage the electronic device 110 from the electronic device stand 70.

When the device 110 is attached to the docking station 70, the device 110 may be used to display information, to enjoy multimedia, stream content, charge the tablet, as well as control smart-home functionality (e.g., remote control of air conditioning, interior and exterior lights, appliances, alarm, etc.). The rotating member 80 may rotate the electronic device 110 between at least two different orientations when the electronic device is attached to the docking station. For example, the device may be switched between a portrait and a landscape orientation. The proposed system of the device 110 and the docking station 70 may be used in different environments at work or at home; kitchen, living room, bedroom, office cube, etc.

Figure 3:
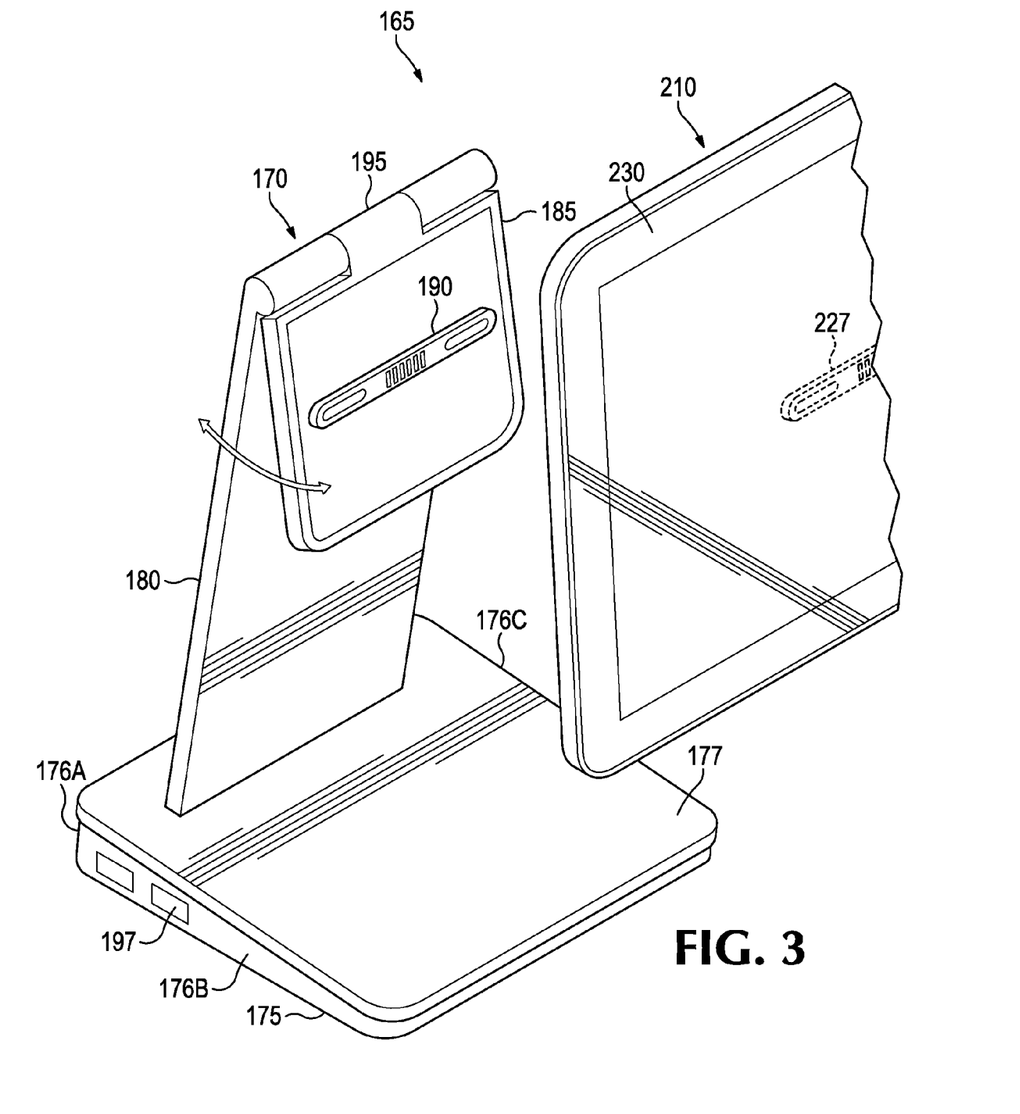
FIGS. 3 and 4, respectively, represent a font and a rear perspective view of a system including an electronic device stand and an electronic device according to an example implementation.
Figure 4:
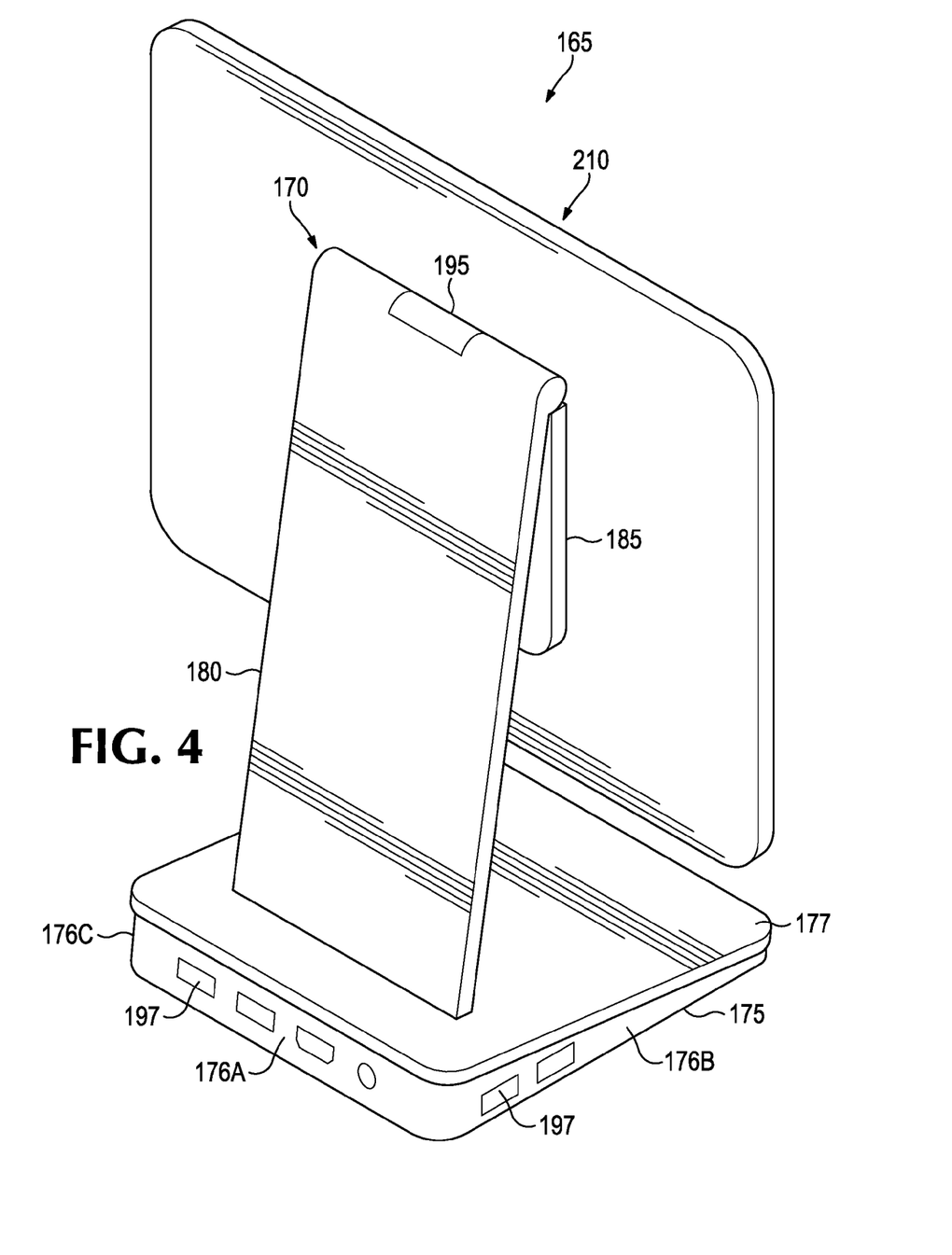

FIGS. 3 and 4, respectively, represent a front and a rear perspective view of a system 165 including an electronic device stand or accessory 170 and an electronic device 210 according to an example implementation. The components of the electronic device 210 may be similar to the corresponding components of the electronic device 10 described with respect to FIG. 1.

The electronic device stand 170 includes a base 175, a first elongated arm or section 180 connected to the base 175, a second section or a connector 185 connected to the first section 180, and a male connector 190 extending from the second section 185 to attach to a female connector 227 of the electronic device 210 when the electronic device 210 is attached to the electronic device accessory 170. The components of the male connector 190 may be similar to the corresponding components of the male connectors 190 described with respect to FIG. 2. In addition, the components of the female connector 227 may be similar to the corresponding components of the female connectors 27 and 127 described with respect to FIGS. 1 and 2. Thus, the electronic device 210 with the female connector 227 attaches to the stand 170 is a similar manner as the electronic device 110 shown in FIG. 2 attaches to the stand 70.

The described device 210 having a rear connector 227 allows the user to quickly snap on or magnetically attach device 10 to the stand 170 and convert it into an all-in-one device or a monitor. The electronic device accessory 170 may further include a rotational mechanism 195 (e.g., a hinge) connecting the first section 180 and the second section 185, the rotational mechanism 195 adjusting the angle between the first section 180 and the second section 185 to support the electronic device in a plurality of positions. Thus, when the electronic device 210 is attached to the electronic device accessory 170, a user may simply move the device 210 (or the second section) to change the between the first section 180 and the second section 185 and, consequently, the position of the device 210. The angle between the first section 180 and the second section 185 may vary depending on the structure of the accessory 170 and the rotational mechanism 195 (e.g., the angle can be between minus 20 degrees to 135 degrees, etc.).

As shown in FIGS. 3 and 4, the first section 180 and the second section 185 are substantially planar. In other examples, sections 180 and 185 may have different forms that are sufficient to support the electronic device 210 on the second section 185 and to transition the electronic device 210 between different positions without removing the electronic device from the stand 170. The illustrated sections 175, 180, and 185 may be constructed from polished metal, aluminum, plastic, or any other type of suitable material. Sections 175, 180, and 185 may be constructed as one single piece or may be constructed as separate pieces that are later attached to each other.

The first section 175 of the accessory 170 may also include at least one port 197, speakers (not shown), and other components embedded in the second section 20. For example the first section 175 includes four ports 197 positioned on the first side surface 176A and two ports 197 positioned on the second side surface 176B. Alternatively, ports may also be positioned on different portions of the first section 176 (e.g., on the third side surface 176C, on the top surface 177, etc.), or on other sections of the stand 170. The ports 197 may be positioned in such a way that they are accessible to user regardless of the position of the second section 185 and the orientation of the device 210.

The ports 197 may include any type of a port or an opening that allows for communication and/or interaction with external devices or objects. For example, the ports 197 may include an HDMI port (e.g., full size HDMI, mini HDMI, micro HDMI etc.), a USB port (e.g., full size USB, mini USB, micro USB, power USB), a Thunderbolt port, a memory card reader slot, a DC power jack, a RJ-45 port, an audio jack or port, (e.g., for headphone, microphones, etc.) or any other type of port. The stand 170 may also include various buttons or keys (e.g., power, volume, etc.), as well as different displays or indicators (e.g., to indicate charging, low battery, etc.). The stand 170 may further include connecting elements (e.g., the connector 190) as well as electronic elements or circuits (not shown) that can facilitate the interaction between the stand 170 and the electronic device 210.

The at least one port 197 provides enhanced connectivity of the electronic device 210 when the device 210 is attached to the stand 170. For example, the electronic device 210 may receive power through one of the ports 197 and a user may power charge the electronic device 210 without removing the device 210 from the stand 170. In addition, the combination between ports 197 and the dock connector 190 allows for a full spectrum of connection and communication capabilities between the device 210 and a variety of external accessories (e.g., a screen, a speaker, a mouse, etc.).

What is claimed is:

1. An electronic device comprising:
   a housing including at least a front section including a display and a rear section that is opposite to the front section; and
   a connector embedded in a center of the rear section,
   wherein the connector includes a connection portion to electronically connect the electronic device to an external system and an attachment portion to mechanically attach the connector to the external system.

2. The electronic device of claim 1, wherein the connector is recessed into the rear section of the electronic device to define a female connector portion of the connector.

3. The electronic device of claim 2, wherein the connector is to engage an extended male connector portion positioned on the external system.

4. The electronic device of claim 3, wherein the attachment portion of the connector includes at least one magnet to attach the connector to the extended male connector portion of the external system.

5. The electronic device of claim 1, wherein the connector is to support the electronic device in at least a first orientation and a second orientation when the electronic device is attached to the external system.

6. A docking station comprising:
a first housing;
a rotating member mounted to the first housing and rotatable with respect to the first housing;
a male connector mounted to the rotating member; and
a fastener embedded in the male connector,
wherein the male connector is to connect to a recessed female connector of an electronic device, and rotation of the rotating member causes corresponding rotation of the electronic device relative to the docking station when the male connector is connected to the recessed female connector of the electronic device.

7. The docking station of claim 6, wherein the male connector is to electronically connect to a connection portion of the recessed female connector, and the fastener is to mechanically attach to an attachment portion of the recessed female connector.

8. The docking station of claim 7, wherein the fastener includes a magnet to attach to a magnet of the attachment portion of the recessed female connector.

9. The docking station of claim 6, wherein the male connector is protruded from the rotating member of the docking station to engage the recessed female connector.

10. The docking station of claim 6, wherein the rotating member is to rotate the electronic device between a portrait orientation and a landscape orientation when the electronic device is attached to the docking station.

11. The docking station of claim 6, wherein the first housing is circular in shape.

12. The docking station of claim 6, wherein the rotating member is rotatable relative to the first housing between a first position and a second position, wherein the male connector has a width that extends along a first direction when the rotating member is rotated to the first position, and wherein the width of the male connector extends along a different second direction when the rotating member is rotated to the second position.

13. The docking station of claim 6, wherein the male connector is rotatable with the rotating member as the rotating member is rotated relative to the first housing.

14. The docking station of claim 6, wherein rotation of the rotating member causes corresponding rotation of the electronic device relative to the docking station while the docking station remains fixed in position when the male connector is connected to the recessed female connector of the electronic device.

15. A system comprising:
an electronic device comprising:
a display section,
a rear section that is opposite to the display section, and
a recessed female connector positioned at a center of the rear section; and
an electronic device accessory to support the electronic device in a plurality of positions, the electronic device accessory comprising:
a base,
a first elongated section connected to the base and to a second section,
a male connector extending from the second section to attach to the female connector of the electronic device when the electronic device is attached to the electronic device accessory, and
a rotational mechanism connecting the first elongated section and the second section, the rotational mechanism adjusting an angle between the first elongated section and the second section to support the electronic device in the plurality of positions.

16. The system of claim 15, wherein the female connector includes a connection portion to electronically connect the electronic device to the electronic device accessory, and an attachment portion to mechanically attach the female connector to the male connector of the electronic device accessory.

17. The system of claim 16, wherein the attachment portion of the female connector includes at least one magnet to attach the female connector to the male connector.

18. The system claim 15, wherein the female connector is recessed into the rear section of the electronic device and the male connector is protruded from the second section of the electronic device accessory to engage the female connector.

19. The system of claim 15, wherein the rotational mechanism comprises a hinge that pivotally connects the first elongated section and the second section.

* * * * *

UNITED STATES PATENT AND TRADEMARK OFFICE
CERTIFICATE OF CORRECTION

PATENT NO. : 9,680,253 B2
APPLICATION NO. : 15/035332
DATED : June 13, 2017
INVENTOR(S) : Dimitre Mehandjiysky et al.

It is certified that error appears in the above-identified patent and that said Letters Patent is hereby corrected as shown below:

In the Claims

In Column 10, Line 35, in Claim 18, delete "system claim" and insert -- system of claim --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*